United States Patent [19]
Prenzel et al.

[11] 3,772,933
[45] Nov. 20, 1973

[54] MEANS FOR PERFORMING GEAR CHANGES IN MULTI-RATIO GEAR-BOXES

[75] Inventors: Karl Prenzel, Neu-Katzwang; Hans Barthel, Nurnberg, both of Germany

[73] Assignee: Ardie-Werk GmbH, Nurnberg, Germany

[22] Filed: Oct. 8, 1971

[21] Appl. No.: 187,920

[30] Foreign Application Priority Data
Oct. 12, 1970    Germany.................. P 20 50 038.3

[52] U.S. Cl................................ 74/335, 74/752 A
[51] Int. Cl............................ F16h 5/06, F16h 3/74
[58] Field of Search.................... 74/335, 336, 866, 74/364, 752 A; 192/3.58

[56] References Cited
UNITED STATES PATENTS 3,530,668    9/1970    Siebers et al. .................... 74/336 X
3,298,483    1/1967    Morrison .......................... 192/3.58
3,578,123    5/1971    Freeland .......................... 192/131 R
3,286,541    11/1966   Dearnley et al. .................... 74/339
3,605,966    9/1971    Erdman ............................ 74/335 X

*Primary Examiner*—Arthur T. McKeon
*Attorney*—Richard K. Stevens et al.

[57] ABSTRACT

An apparatus for changing gears in a gear box which has a hydraulic system including a fluid pressure reservoir, cylinders and hydraulically actuated pistons, a sump for the fluid and a plurality of valves for the direction of the fluid between the reservoir, cylinders and sump is provided with a cover for the gear box which has the various components of the hydraulic system mounted thereon. In a preferred embodiment, the reservoir, cylinders, valves and sump are directly connected together without conduits therebetween.

4 Claims, 4 Drawing Figures

MEANS FOR PERFORMING GEAR CHANGES IN MULTI-RATIO GEAR-BOXES

A method and apparatus are disclosed in patent application Ser. No. 46,555 filed by Gunter Siebers, Karl Prenzel and Hans Barthel on June 15, 1970 for performing gear changes in multi-ratio gear-boxes, especially for heavy vehicles, wherein axially sliding pinions or toothed dogs are moved electro-hydraulically to provide different gear ratios and in which the disengagement of the previous ratio, the subsequent bringing into synchronism and engagement of the pinions or clutches for the next selected ratio are performed automatically upon initiation of a gear change. Preferably, the declutching of the engine before the above-mentioned disengagement of the gears and the renewed engagement of the engine after the gears are engaged are also performed automatically. One apparatus for carrying out the method comprises an electric or electronic control member which is started or set in operation by hand and/or automatically in accordance with the engine load and speed and the ratio already engaged, and which controls the automatic performance of each gear change, and which further is provided with a source of fluid under pressure and with actuating cylinders of which the pistons are each connected to one of the members in the gear box to be moved during a gear change.

In order to achieve a rapid change of ratio in multi-ratio gear boxes the engagement of the pinions or dogs is undertaken suddenly when a condition of synchronism is achieved by the piston of a hydraulic actuating cylinder. This piston is exposed suddenly to, or relieved of, a sufficiently large volume of fluid to perform its displacement suddenly through the medium of an instantly acting two-stage electro-hydraulic control. The speed of rotation of one of the two components of a gear box which are to be engaged when the gear ratio is changed is rapidly decreased or increased while the motor and drive shaft are disconnected so that only small masses have to be slowed down or speeded up. This deceleration or acceleration of the rotation of one of the components to achieve synchronization is preferably started as soon as the previously engaged components in the gear box are disengaged.

Each of the actuating cylinders of the apparatus is connected to at least one hydraulically actuated two-position three-way main valve through a pipe of large internal diameter. The valve is also connected to a reservoir of fluid under pressure and to a fluid sump by pipes of large internal diameter to provide in each direction of operation a large cross-sectional area for flow. Each main valve is controlled by an electromagnetic two-position three-way primary valve with a small operating winding connected to the control member. This valve opens only a small cross-sectional area in each direction of operation, and is connected on the one hand to the actuating cylinder of the associated main valve and on the other hand to the fluid pressure reservoir and the fluid sump through pipes of small internal diameter.

Each axially movable pinion or dog may engage a different toothed member or gear wheel in each of two different gear ratios and can be connected to a piston which is movable in a cylinder into two end positions and into an intermediate position. Three pipes of large internal diameter are connected to each cylinder. One of the pipes is connected to the reservoir and the two others are connected to two main valves which are hydraulically actuated two-position three-way valves each connected to the reservoir and to the sump through pipes of large internal diameter. Each main valve uncovers a large cross-sectional area in each operative position. Each valve is controlled by an electromagnetic two-position three-way primary valve with a small energizing winding connected to the control member. The two primary valves each uncover only a small cross-sectional area in each operative position, and are in communication on the one hand with the actuating cylinder of a respective one of the main valves and on the other hand with the fluid pressure reservoir and the fluid sump through pipes of smaller internal diameter. The main valves are controlled so that, in the intermediate position of the piston, two of the pipes that lead into the cylinder are connected to the reservoir while the third pipe is in communication with the sump. In the one end position of the piston, all three pipes are in communication with the reservoir, and in the other end position of the piston only one of the pipes is connected to the reservoir and the remaining two pipes are connected to the sump.

Furthermore, each cylinder can have an annular stop which divides the cylinder into a front portion in which the first piston, connected to the pinion or dog to be moved slides, and a rear portion in which a second piston moves. This piston, when it engages the annular stop, has its piston rod projecting sufficiently into the front portion of the cylinder that the first piston is in the intermediate position equidistant from the annular stop and from the front inner end wall of the cylinder. The rear portion of the cylinder is at least long enough for the engagement of the second piston against the rear inner face of the cylinder to allow the free end of its piston rod to lie just outside the front portion of the cylinder. The effective surface area of the first piston on that side of it which faces the second piston is larger than that which faces the forward end face of the cylinder. Of the three large-diameter pipes communicating with the cylinder, the two pipes which are equipped with respective main valves open into the cylinder in or near the rear inner end face of the cylinder and near the annular stop respectively. The pipe that has no main valve opens into or near the front inner end face of the cylinder. An electro-magnetically actuated two-position three-way valve can be interposed between the pressure fluid reservoir and the primary and main valves. This valve is connected to the sump through a further pipe so that in one operative position of the last-mentioned valve the reservoir is connected to the pipes leading to the primary and main valves and the cylinder and, in the other operative position, the sump is connected to these pipes.

The electro-magnetically actuated primary valves and the hydraulically operated main valves, but at least the primary valves, may be formed as poppet valves, for example ball-type poppet valves.

Particularly preferred is the embodiment in which one of the gear box components which are to be brought into mutual synchronism at each ratio change and which runs freely when the driving engine is declutched and the gear box is in neutral is connected to a special device, controlled by an electrical control member, for speeding it up or slowing it down at will. Preferably the device is in the form of a hydraulic assembly which acts as a motor or a pump. This assembly can be connected through two pipes to an electro-magnetically actuated three-position four-way valve controlled from the control member, which valve is also connected to the fluid pressure reservoir and the sump. In the first operative position the two pipes are put in communication with the reservoir and the sump respectively. In the second operative position, the pipes are disconnected from the reservoir and sump and are connected together. In the third operative position, the pipes are not connected to the reservoir and sump or to each other. A pressure relief valve is connected between the pipes in parallel with the assembly, this valve opening in a direction from the delivery pipe to the intake pipe of the assembly.

Instead of this the said device can also be made up of a separate braking device and a separate motor. Preferably the device is connected to the lay-shaft of a gear box which has both a main shaft and a lay-shaft.

The friction clutch which is connected ahead of the gear box may be operated by a hydraulic actuating cylinder having a piston connected to the movable component of the clutch. The cylinder is connected to an electro-mechanically actuated valve arrangement controlled by the electrical control member and connected both to the fluid pressure reservoir and to the sump. In one operative position the valve puts the cylinder in communication with the reservoir while in its other operative position it puts the cylinder in communication with the sump. The valve arrangement can comprise a hydraulically actuated two-position three-way main valve which uncovers a large cross-sectional area in each operative position, and an electromechanically actuated two-position three-way primary valve which uncovers only a small cross-sectional area in each operative position and it is connected through the small actuating winding to the control member. The main valve is connected on the one hand through a pipe of large internal diameter to the cylinder and on the other hand through pipes of large internal diameter to the fluid pressure reservoir and the sump respectively. The primary valve is in communication through pipes of small internal diameter on the one hand with the actuating cylinder of the main valve and on the other hand with the reservoir and sump respectively.

The electro-magnetically actuated primary valve can be formed as a poppet valve, for example as a ball-type poppet valve, and the same applies to the hydraulically actuated main valve. Moreover in the pipe between the actuating cylinder associated with the clutch and the valve arrangement or the main valve there can be inserted a one-way valve which is effective only in a direction away from the cylinder in that it only provides its throttling effect when fluid flows from the cylinder to the valve arrangement or main valve, but has no throttling action on fluid flowing into the cylinder in the opposite direction.

The actuating cylinders for the pinions or dogs which are to be moved at each ratio change can be mounted side by side on a common housing component carrying the guides and seals for the piston rods and the switches for signalling the engaged and disengaged conditions of the gear ratios. This housing component is secured in its turn to a second housing component which is provided with the connections and the primary and main valves for the actuating cylinders. They can have machined surfaces and bores for mounting them on the gear box housing. The pipes to the actuating cylinders can be machined into housing portions and can be sealed to the co-operating engaging faces between the cylinders and the first and second housing portions by inserted sealing rings. For the fluid pressure supply, a separate connection manifold is secured to the side of the second housing portion and has at least two non-return valves in the pipe leading to the pump, arranged so that the pressure after the first non-return valve acts on both the reservoir and also the primary valves, and the pressure after the second non-return valve reaches the main valves.

Each actuating cylinder could have two main valves and two primary valves associated with it, the main valves being arranged in the lower part, nearest the gear box housing, of the second housing portion, arranged in the housing portion itself and parallel to each other while the primary valves are secured in a recess of their own in the second housing portion above the main valve, parallel to the main valves and to each other, the recess being joined to a recess in the first housing portion which carries the switches for indicating the gear-engaged condition and forming, together with the other recess and the cover portion, a closed chamber which is filled with oil to prevent the condensation of water vapor.

An object of this invention is to provide a means for effecting gear changes of the type described in the aforesaid patent application which performs gear ratio changes more rapidly and which is adapted to be mounted economically and easily on conventional gear boxes without limiting freedom for accessibility and disassembly of the gear box.

It is known that many multi-speed gear boxes are built on the modular system so that a gear box main unit containing the dogs to be actuated or pinions to be moved on change of ratio can have different additional units added to it to adapt it for special purposes such as for a four wheel drive. In addition, it is necessary in most gear wheel boxes, especially those for motor vehicles, to provide means for driving auxiliary equipment or for the fitting of additional assemblies, generally to be driven from the lay-shaft of the gear box. Both possibilities have been taken into account by the invention.

In addition, with the apparatus according to the invention, engagement of reverse gear in the gear box is achieved so that it is unnecessary to provide any manual gear levers and devices. The apparatus can be fitted directly onto the gear box housing in place of the conventional housing cover. The above mentioned aim is achieved according to the invention in that the pressure fluid source with the sump, all ratio-change actuating cylinders with their associated main valves and primary valves and if necessary the clutch-actuating cylinder with its associated valve arrangement and the driving and braking assemblies are combined together into a component which is capable of being mounted on the gear box as a cover. Preferably the constructional units containing the fluid pressure source with the sump and all actuating cylinders for the ratios with their associated main valves and primary valves and if necessary the clutch actuating cylinder and if necessary the driving and braking assemblies are arranged without intermediate pipes, with mutually aligned connecting openings sealed tightly together. The above-mentioned constructional units could with advantage be mounted on a common base plate or alternatively mounted in a common cover-shaped cast housing.

If an assembly is provided for the speeding-up or slowing down at will of the free-running gear box component rotating with the lay-shaft of the gear box, of the two gear box components to be brought into mutual synchronism on a ratio change, then in a further advantageous embodiment of the invention this assembly is connected to a co-axial pinion which rotates with the lay-shaft of the gear box. The pinion can mesh directly with a pinion keyed onto the lay-shaft of the gear box or alternatively it can engage in one of the gear wheels to be brought into engagement on the main shaft of the gear box.

According to a preferred further feature of the invention there is also provided in the cover-shaped component an actuating cylinder with a control valve arrangement connected to the control member, serving to engage and disengage the reverse ratio of the gear box.

In this way all the necessary hydraulic and electro-magnetic members necessary for performing ratio changes in a toothed wheel gear box, including the source of fluid pressure and the assembly for speeding up and slowing down of those gear box components which are to be brought to a synchronous condition and the clutch-actuating device are brought together in one component which can be mounted on the gear box in place of the normal cover. This leads, among other things, to reduced ratio changing times since on the one hand the path to the gear box itself is shortened and the masses which have to be moved at each ratio change are reduced, and on the other hand the paths for flow of the fluid under pressure are substantially reduced as the individual members are directly side-by-side. In addition in orthodox gear boxes with a main shaft and a lay-shaft the lay shaft is also free at that end which is furthest from the clutch, for the addition of further auxiliary items of equipment to be driven and/or for the mounting of additional gear box modules, as is necessary in the operation usual in gear box constructions according to the modular principle.

Also the space taken up by the apparatus is reduced to a minimum without adversely affecting the accessibility to the individual components or units or hydraulic and/or electromagnetic members mentioned. Any hand-operated gear levers are superfluous as the apparatus acts directly on a normal mass-produced gear box. Also reverse gear is engaged and disengaged by the apparatus.

Only the electric or electronic control member is not necessarily mounted in the cover-like component but can be arranged at any other desired position. In a further advantageous embodiment of the invention, a hydraulic actuating cylinder is provided with at least one main valve and one primary valve and co-operates with an axially slidable and rotatable ratio-changing shaft for suddenly rotating it, the shaft being axially movable by a second hydraulic actuating cylinder in accordance with the gear ratio which has been selected. In this embodiment always only the two above-mentioned actuating cylinders are necessary, regardless of how many ratios the gear box in question has. Not only are extremely few components necessary but the space taken up is also substantially reduced. The ratio-changing times are not substantially lengthened as the axial displacement of the operating shaft is performed while the components that are to be brought into engagement are being brought into a condition of synchronism.

If each axially movable pinion or dog of the gear box is capable of engagement in a respective different toothed member in each of two different ratios, then according to a further feature of the invention the actuating cylinder for rotating the ratio-changing shaft is formed as a three-position cylinder having a piston which is movable in the cylinder into two end positions and an intermediate position. Three pipes of large internal diameter open into the cylinder. One pipe is connected to the source of fluid pressure and the other two are connected to respective hydraulically actuated two-position three-way main valves. Each of the two main valves is also connected to the fluid pressure source and to the sump through a pipe of large internal diameter. In each direction of operation the main valves uncover a large cross-sectional area and are each controlled by a respective electro-magnetic two-position three-way primary valve with a small energizing winding connected to the control member. The two primary valves each uncover only a small cross-sectional area in each operative position and are in communication on the one hand with the actuating cylinder of one of the main valves and on the other hand with the fluid pressure source and the sump through pipes of small internal diameter. The main valves are controlled so that in the intermediate position of the piston two of the pipes that open into the cylinder are connected to the fluid pressure source, while the third pipe is in communication with the sump. In one end position of the piston all three pipes are connected to the fluid pressure source and in the other end position of the piston only one of the pipes is connected to the source and the remaining two pipes are connected to the sump. Preferably, the cylinder has an annular stop which divides the cylinder into a front portion in which the first piston connected to the angularly movable gear-changing slides, and a rear portion in which a second piston slides. When the second piston engages the annular stop, its piston rod projects so far into the forward portion of the cylinder that the first piston, engaging against the free end of this piston rod, is in its intermediate position in which it is equidistant from the angular stop and from the front inner end face of the cylinder. The rear portion of the cylinder is at least long enough so that on engagement of the second piston against the rear inner end face of the cylinder the free end of its piston rod lies just outside the front portion of the cylinder. Furthermore, the effective surface area of the first piston on that side of it which faces the second piston is larger than on that side of it which faces towards the front end face of the cylinder. Of the three pipes of large internal diameter which open into the cylinder, the two pipes which are provided with respective main valves open into the cylinder in or in the neighborhood of the rear internal face of the cylinder and in the neighborhood of the annular stop respectively, while the pipe that has no main valve in it opens into the cylinder in or in the neighborhood of the front inner end face.

In place of such an actuating cylinder with two axially sliding pistons and an annular stop one may use with advantage a rotary piston actuating cylinder, having a central angularly movable sleeve connected to the gear-changing shaft to turn it, and to which a first segmental piston is secured, corresponding to the above mentioned first piston, a second segmental piston being provided corresponding to the above mentioned second piston and being angularly movable between two end stop positions, namely between an end position spaced away from the end position of the first segmental piston and an intermediate position lying nearer to the end position of the first segmental piston.

Preferably there is inserted in the pipes between the fluid pressure source and the primary and main valves an electro-magnetically actuated two-position three-way valve which is moreover connected to the sump through a further pipe so that in one operative position of the valve the fluid pressure source is connected to the pipes leading to the primary and main valves and the cylinder and in the other operative position the sump is connected to these pipes.

The electro-magnetically actuated primary valves and the hydraulically actuated main valves, at least however the primary valves, are preferably constructed as poppet valves, especially as ball-type poppet valves.

The piston rod of the actuating cylinder for angularly moving the gear-changing shaft can be constructed as a toothed rod or rack meshing with a pinion which is mounted on the gear changing shaft to rotate with it but to be axially movable on it. If a rotary piston actuating cylinder is employed its above-mentioned rotary sleeve takes the place of the pinion and so a toothed rod or rack is unnecessary. The gear-changing shaft can with advantage have a key-like finger which, in each axial position of the shaft, engages against the gear changing fork of a different pinion or toothed gear-changing member in the gear box.

According to a further feature of the invention the gear-changing shaft is slidable into three axial positions by a hydraulically actuating cylinder which is constructed and operates in the same manner as the above-characterized actuating cylinder for moving the gear-changing shaft angularly, apart from the fact that the main valves associated with it are actuated electromagnetically and connected directly to the control member, i.e. not through a respective electro-magnetic primary valve.

Preferably the gear-changing shaft co-operates with switches which are associated with different axial positions of the shaft and are actuated by the shaft when it attains the respective axial position to provide a signal for the control member.

An embodiment of the invention by way of example is described in the following in conjunction with the accompanying drawings, in which.

Figures 1, 2:
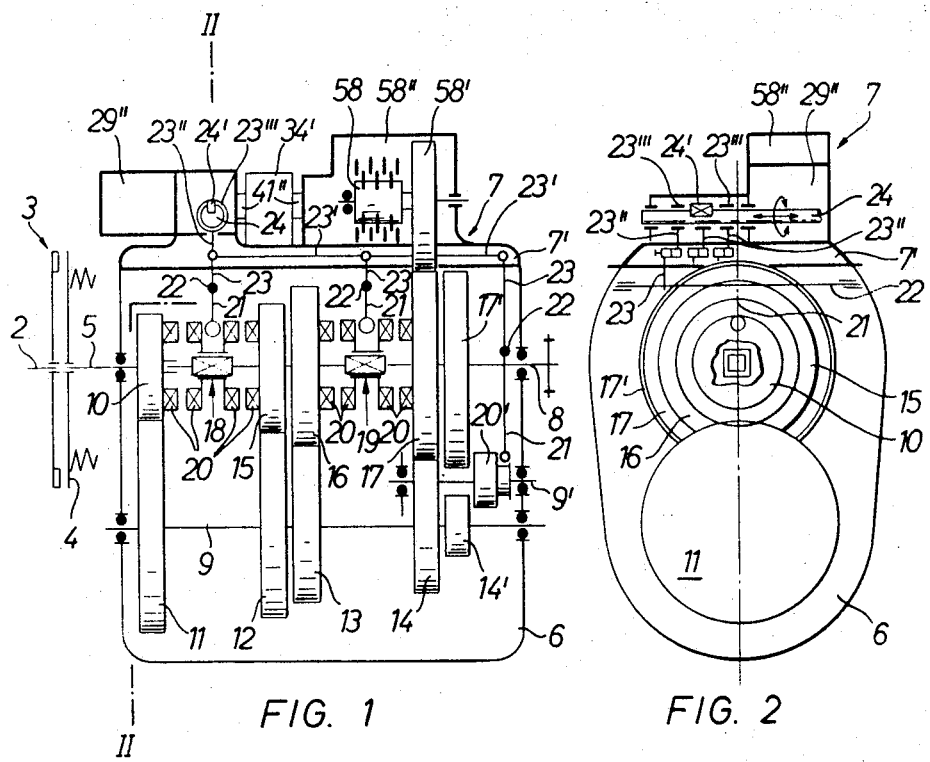
FIG. 1 illustrates diagrammatically a partially sectioned side elevation of a gear box provided with an embodiment of the device of the invention.
FIG. 2 is a section along the line II—II in FIG. 1, likewise shown diagrammatically.

In the apparatus according to the invention illustrated in the drawing there is shown apparatus suitable for being applied to a heavy goods vehicle. The engine of the vehicle, not shown, is connected through a shaft 2 to a friction clutch 3, of which the movable portion 4 is secured non-rotationally to the drive shaft 5 of the toothed wheel multi-ratio gear box 6, but is axially movable on that shaft. In place of a cover the gear box 6 has mounted on it the gear-changing apparatus 7 which is now to be described.

The gear box 6 is of orthodox construction, provided with a main shaft 8 and a lay-shaft 9. The main shaft 8 forms the gear box output shaft connected to the driven wheels of the vehicle. It is connected through the lay-shaft 9 to the gear box input shaft 5. On it are provided gear wheels 10 to 17 and the gear-changing sleeves 18 and 19. The gear wheel 10 is mounted to rotate with and to be axially fixed with respect to the shaft 5 and the gear wheels 11, 12, 13 and 14 are similarly mounted on the shaft 9. While the gear wheel 11 on the shaft 9 meshes with the gear wheel 10 on the shaft 5, the gear wheels 12, 13 and 14 on the lay shaft 9 are in constant mesh with the gear wheels 15, 16 and 17 of the gear box 6, which are mounted on the main shaft 8 to be axially fixed but freely rotatable.

In contrast the gear-changing sleeves 18, 19, are mounted on the main shaft 8 to be secure against rotation with respect to it but to be axially movable on it, so that their dogs 20, provided on both faces can be brought into engagement at will with corresponding dogs on the gear wheel 10 and 15 or 16 and 17. When the sleeves 18 and 19 are in their intermediate positions, as shown in FIG. 1, then when the shaft 5 rotates all the gear wheels 10 to 17 and also the lay-shaft 9 of the gear box 6 rotate with it, but not the main shaft 8. This is only caused to rotate when the sleeve 18 or the sleeve 19 is moved into engagement with the dogs 20 of the gear wheel 10 or 15 or 16 or 17. Then, for a given speed of the shaft 5, the shaft 8 rotates at different speeds according to which of the gear wheels 10, 15, 16 or 17 is engaged by the sleeve 18 or 19. For a given speed of the shaft 5 the engagement of the sleeve 19 in the dogs 20 of the gear wheel 17 gives the lowest speed for the shaft 8, engagement of the sleeve 19 in the dogs 20 of the gear wheel 16 gives a greater speed for the shaft 8, engagement of the sleeve 18 in the dogs 20 of the gear wheel 15 gives a still further higher speed to the shaft 8, and the engagement of the sleeve 18 in the dogs 20 of the gear wheel 10 gives the highest possible speed for the shaft 8, equal to the speed of the shaft 5. It will be understood that only one of the two sleeves 18 and 19 can be engaged at a time and the other must then be left in its intermediate position as shown in FIG. 1.

On the lay-shaft 9 there is keyed a further gear wheel 14', and opposite it an additional gear wheel 17' is mounted on the main shaft 8 to be axially fixed but freely rotatable. On engagement of a gear wheel 20', axially movable on an auxiliary lay-shaft 9', in the gear wheels 14' and 17', with both sleeves 18 and 19 in their intermediate positions shown in FIG. 1, the direction of rotation of the main shaft 8 is reversed, so that reverse gear is engaged.

The axial displacement of the gear-changing sleeves 18 and 19 and of the gear wheel 20' is performed by means of an arm 21 which engages in an annular groove in the sleeve 18 or 19 or in the gear wheel 20', and is mounted on a shaft 22 which is rotatably mounted and extends perpendicular to the shaft 5, 8, 9 and 9'. Each shaft 22 has on that side of it which is away from the arm 21 a further arm 23 secured to it against angular rotation.

In the component 7, constructed in the manner of a cover, two rods 23' are mounted to be axially movable, extending parallel to each other and to the shafts 5, 8, 9 and 9', and are pivotally connected to the end of the arm 23 which is associated with the sleeve 19 and the gear wheel 20'. The arms 23' lie with their other ends co-axial to the other end of the arm 23 which is associated with the sleeve 18. A lever 23'' is pivotally connected to each of the co-axial arm ends and has a gear-changing ring 23''' secured to it. The three mutually co-axial rings 23''' are freely rotatable on a gear-changing shaft 24 which is axially slidable within the rings 23'''. The gear-changing shaft 24 is provided with a key 24' which, according to the axial position of the shaft 24, engages in and picks up a keyway in one of the gear-changing rings 23''' when the shaft 24 is moved angularly.

The shaft 24 is movable angularly into three different angular positions, so that each sleeve 18 or 19 is movable to three positions, namely the intermediate position shown in FIG. 1 and a left hand and right hand end position, in each of which the left hand or right hand mutually adjacent pairs of dogs 20 are brought into engagement. The arm 21 for the gear wheel 20' need only be moved into two positions in which the gear wheel 20' is engaged with the gear wheels 14' and 17' or is disengaged from them.

Figure 4:
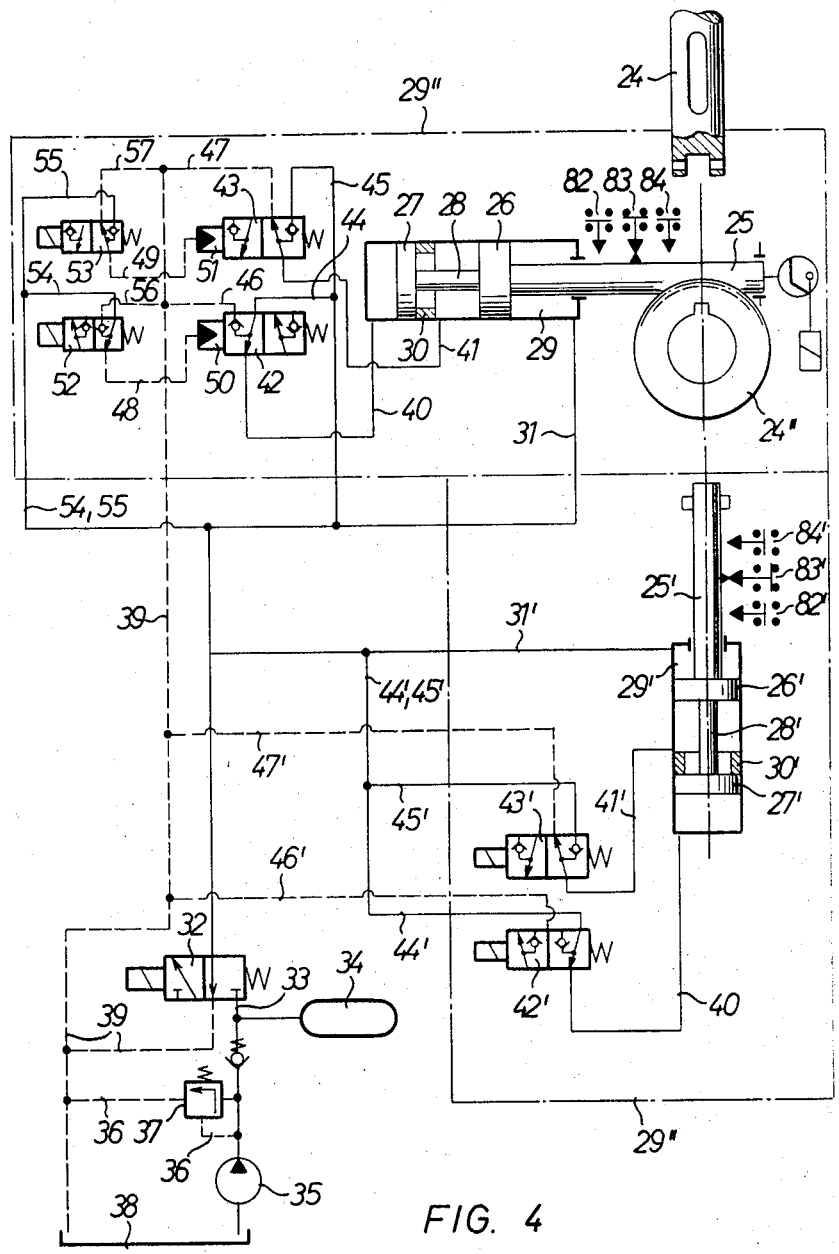
FIG. 4 shows the hydraulic circuit of the gear-changing apparatus of FIGS. 1 to 3.

As shown in FIG. 4 a pinion 24'' is provided on the gear-changing shaft 24 to turn it and it is connected to the shaft 24 against relative rotation but in a manner allowing relative axial movement. Meshing with the pinion 24'' is the piston rod 25, formed as a toothed rod or rack, of a piston 26 which, together with a second piston 27 having a piston 28, is axially movably guided in a cylinder 29. The piston 26 is movable into three different positions in a manner still to be described, namely the intermediate positions shown in FIG. 4 a left hand end position in which it engages an annular stop 30 in the cylinder 29, and a right hand end position in which it is brought into engagement with the right hand inner end face of the cylinder 29. Each of these three positions of the piston 26 is associated with one of three respective angular positions of the gear-changing shaft 24 connected to it and thereby through the coupling linkage described also to three positions of the gear-changing sleeves 18 or 19. In the intermediate position of the piston 26 the associated sleeve 18 or 19 is likewise in its intermediate, disengaged, position as seen in FIG. 1. In the left hand end position of the piston 26 the sleeve 18 or 19 has its dogs 20 engaged in the dogs 20 of the pinion 15 or 17, and in the right hand end position of the piston 26 on the other hand the sleeves 18 and 19 have their dogs 20 engaged in the dogs 20 of the gear wheel 10 or 16.

The actuating cylinder 29 is operated hydraulically and has therefore a number of connections which can be put into communication with a source of fluid pressure or alternatively with a zero-pressure sump. Thus a fluid pressure pipe 31 opens into the cylinder 29 in that neighborhood of that inner end face through which the piston rod 25 extends. This pipe 31 is connected to one side of an electro-magnetic two-position three-way valve 32 of which the other side is connected through a pipe 33 to a pressure fluid reservoir 34. This is fed with fluid by a pump 35 actuated by switch 35', surplus hydraulic fluid returning through the pipe 36 and the relief valve 37 to the sump 38 when the reservoir 34 is full.

In addition the said other side of the valve 32 is in communication through a return pipe 39 with the sump 38. Thus there are three pipes leading away from the valve 32.

In addition to the pipe 31 two further pipes 40 and 41 open into the cylinder 29. While the pipe 40 opens into that rear end face of the cylinder which is opposite the end face through which the piston rod 25 penetrates, the pipe 41 enters the cylinder in the neighborhood of the annular stop 30. The pipes 40 and 41 are connected to respective hydraulically actuated two-position three-way main valves which are in their turn connected through pipes 44 and 45, together with the pipe 31, to the valve 32 already mentioned and are in communication through pipes 46 and 47 with the return pipe 39 leading to the sump 38. The two main valves 42 and 43 are each connected to a respective electro-magnetically actuated two-position three-way primary valve 52 or 53 through a pipe 48 or 49 connected to the actuated cylinder 50 or 51 of the main valve 42 or 43.

In addition to the pipes 48 and 49 there extend from the primary valves 52 and 53 respective pipes 54 and 55 leading to the valve 32, and a pipe 56 or 57 connected to the return pipe 39. In order to move the pistons 26 and 27 in the cylinder 29 in a sudden and rapid manner and accordingly to be able to allow the necessary quantities of fluid to flow extremely rapidly into or out of the corresponding portion of the cylinder 29, the pipes 31, 40, 41, 44, 45, 46, 47 and 33 and 39 are provided with a correspondingly large internal diameter and furthermore the valves 32, 42 and 43 are constructed so that they likewise uncover a correspondingly large cross-sectional area in each operative position. Also for sudden movement of the piston 26 in the cylinder 29 on receiving an appropriate command from the control member (not illustrated) there is the fact that the pipes 40 and 41 each have a large-volume main valve 42 or 43 associated with them, hydraulically controlled by a low-volume electromagnetic primary valve 52 or 53.

The valves 52 and 53 only require low operating forces to actuate them and so their electrical windings can be small and the magnetic fields that need to be built up in them are of low strength and can be built up very rapidly. When the valves 52 and 53 are operated the valves 42 and 43 which follow them are also operated practically simultaneously as the hydraulic connection between the valves 42 and 52 or 43 and 53 allow virtually no delay to occur.

Care is also taken to ensure rapid changeover of the pipes 40, 41 to the valve 32 or the return pipe 39 in that the valves 42, 43, 52 and 53 are formed as poppet valves of the ball type, having no dead travel or overlap travel of the closure member and accordingly a very short working stroke. In orthodox valves with central rotationally symmetrical control slides or spools and annular pressure spaces arranged around them positive overlap of the pressure spaces by the spool is essential in order to keep oil losses as low as possible. Therefore, on each operation of the valve the spool must first move by the amount of overlap before it opens to provide a flow path. This requires extra time and furthermore the solenoid of the valve must be correspondingly powerful because of the longer stroke, i.e. it must be made with a winding of high inductance. All these drawbacks are avoided with ball-type poppet valves 42, 43, 52 and 53.

To shift the shaft 24 axially there is a hydraulically operated actuating cylinder 29' which is made in the same way as the actuating cylinder 29, that is to say, as a three-position cylinder and it has the same construction. Corresponding components, including the pipes, are provided with the same refernce numerals but with indices added. In each of the pipes 40' and 41' there is a corresponding but only single electromagnetic valve 42' or 43' constructed as a ball-type poppet valve and controlled from the control member (not shown) each valve being connected through a pipe 44' or 45' to the valve 32 and through a pipe 46' or 47' to the return pipe 39.

The axial position of the gear-changing shaft 24 is signalled to the control member (not shown) through switches 82', 83' and 84', which are operated by the piston rod 25' or instead by the shaft 24 itself, in order to indicate with which of the gear-changing rings 23''' the shaft 24 is in engagement through the key-like finger 24'. In the same way the piston rod 25 co-operates with switches 82, 83 and 84 in order to tell the control member what angular position the shaft 24 occupies.

The electro-magnetic valves 32, 42', 43', 52 and 53 are connected through electric leads, not shown, to the control member, likewise not shown, and the same applies to the switches 82 to 84 and 82' to 84'. In addition the control member has two electric leads going to it, each connected to a respective revolution counter, not shown, which rotates with the main shaft 8 or the lay-shaft 9 of the gear box. Finally, the control member also has a further electric lead going to it for controlling the hydraulic actuation of the clutch 3 and of the assembly 58, still to be described.

The manner of operation of the overall gear-changing device 7 differs from that of the device of the aforesaid copending application in that, inter alia, at each gear change it is always only the same valves 42, 43, 52, 53 and the same actuating cylinder 29 which are actuated, acting through the pinion 24'' and the gear-changing shaft 24 but on a different gear-changing sleeve 18 or 19 or on the gear wheel 20', the axial shifting of the shaft 24 by means of the actuating cylinder 29' always being undertaken when the sleeves 18 and 19 and the gear wheel 20' are in their disengaged positions and the two sets of dogs 20 to be brought into engagement have been brought to a synchronous condition so that there is no increase of the gear-changing time.

The lay-shaft 9 of the gear box 6 is connected to a hydraulic assembly 58 which can act at will as a motor or a pump. The assembly 58 comprises a co-axial gear wheel 58' which meshes with the gear wheel 17 on the main shaft 8, this gear wheel in its turn engaging the gear wheel 14 on the lay-shaft 9. The gear wheel 17 is mounted to rotate freely on the main shaft 8, whereas the gear wheel 14 on the lay-shaft 9 is keyed to it against relative rotation.

The assembly 58 can for example be connected through a fluid supply pipe (not shown) and a fluid outlet pipe (again not shown) to an electro-magnetically actuated three-position four-way valve which is not shown and which is in communication on the other hand through two pipes to the pressure fluid reservoir 34 and the unpressurized sump 38 respectively. In the one operative position of the above-mentioned valve all the pipes are closed off so the hydraulic assembly 58 acts as a pump which delivers fluid to the fluid output pipe and from there into a further pipe against a pressure relief valve contained in it, opening into the fluid feed pipe from which the assembly 58 draws fluid under pressure. Thus the assembly 58 must continuously develop a pressure equal to the opening pressure of the relief valve and thus has a braking action on the lay-shaft 9 of the gear box 6.

In the second position of this valve the pipes leading to the fluid pressure reservoir and to the non-pressurized fluid-receiving sump are, as before, closed off but the fluid feed pipe and the fluid outlet pipe are connected together so that the pipe with the pressure relief valve is by-passed. The assembly 58, driven by the lay-shaft 9, therefore acts as before as a pump but without having to deliver fluid to the feed pipe and the outlet pipe against a pressure, and therefore also practically without exerting any braking action on the lay-shaft 9. In a third position the valve connects the fluid feed pipe to the pipe that leads to the pressure fluid reservoir 34 and furthermore it connects the fluid outlet pipe to the pipe leading to the non-pressurized fluid-receiving sump 38, so that the hydraulic assembly 58 is exposed to the fluid under pressure from the reservoir 34 and can behave as a motor which drives the lay-shaft 9.

As will be seen from FIG. 1 of the accompanying drawing, the assembly 58 can however be made up of a separate friction clutch and a separate driving motor, which are likewise controlled by the above-mentioned control member.

To actuate the friction clutch 3 the vehicle provided with the apparatus according to the invention can be provided with an actuating cyclinder (not shown) of which the piston is connected to the movable part 4 of the clutch 3. The cylinder is in communication through a pipe with a hydraulically actuated two-position three-way valve which is connected on the other hand through a further pipe to the pressure fluid reservoir and through an additional pipe to the fluid-receiving sump. The actuating cylinder of the valve is connected through a pipe to an electro-magnetically actuated two-position three-way pirmary valve which is connected on the other hand through two pipes likewise to the pressure fluid reservoir and to the sump. In order to ensure rapid actuation of the cylinder with the necessary volume of pressurized fluid, the fluid pipes between the cylinder and the hydraulically actuated valve and between the cylinder and the pressure fluid reservoir have a correspondingly large internal diameter and furthermore the hydraulically actuated valve is constructed so that it uncovers a correspondingly large cross-sectional area at least in the position that connects the two pipes. For the reasons already explained in connection with the pressure fluid actuation of the cylinder 29, an electro-magnetic main valve is not used but instead of this the main valve is constructed as a hydraulically operated valve which is controlled by a low-volume electromagnetically operated primary valve. Again for the reasons already given above the primary and main valves are each constructed in the form of ball-type poppet valves.

In order to ensure rapid disengagement of the clutch 3 but gentle re-engagement, a one-way restricting valve is inserted in the fluid pipe between the clutch actuating cylinder and the hydraulically actuated main valve, providing a large cross-sectional area for flow in a direction towards the cylinder but only a small cross-sectional area in the reverse direction.

Figure 3:
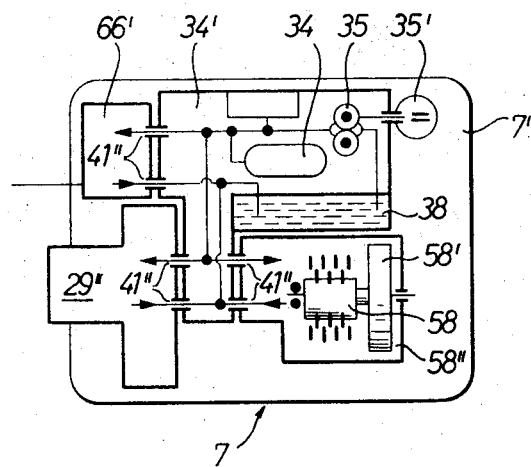
FIG. 3 is a partially sectioned plan view of the embodiment of FIGS. 1 and 2, again shown diagrammatically.

It is of substantial significance that in the device according to the invention all the above-mentioned members and constructional elements necessary for performing the automatic gear change are brought together in a constructional unit 7 which is mounted on the change-speed gear box 6 in place of the usual cover, as is shown clearly in FIG. 1. The constructional unit 7 includes, as is shown particularly clearly in FIG. 3, four units 29'', 34', 58'' and 66'. These units are mounted on a common base plate 7'. The unit 29'' contains the hydraulic actuating cylinders and the hydraulic and electro-magnetically actuated associated valves which operate the sliding sleeves 18 and 19 and engage and disengage reverse gear. The unit 34' contains the pump 35 driven by a direct current motor 32', the fluid reservoir 34 and the fluid sump 38 as well as the valves 32 and 37, i.e. all the members and constructional elements required for providing the pressure fluid. The unit 58'' includes the assembly 58 with its gear wheel 58'. Finally, the unit 66' contains the clutch-actuating cylinder and the associated control valves, i.e. all the members and components necessary for engaging and disengaging the clutch 3.

The units 29'', 34', 58'' and 66' are secured on the common base plate 7' closely together so that they are arranged without intermediate connecting pipes but instead with mutually aligned and mutually engaging connecting orifices 41'''. In this way the path for fluid flow is substantially reduced, which favors a reduction in the time taken for gear changes.

As the gear box 6 is completely free on the side opposite the clutch 3, especially as the end of the lay-shaft 9 is not obstructed by the assembly 58, this shaft can be extended to drive any desired auxiliary equipment, or further gear box components or modules may be mounted against the gear box 6 to make it suitable for various purposes, for example for an all-wheel drive on a vehicle. This is of particular significance in view of the increasingly common construction of gear boxes on the modular principle.

Although the invention has been described in detail for the purpose of illustration, it is to be understood that such detail is solely for the purpose of illustration and that variations can be made by those skilled in the art without departing from the spirit and scope of the invention except as it may be limited by the claims.

What is claimed is:

1. In an apparatus for automatically or semi-automatically performing rapid gear changes in a multi-ratio change-speed gear box having members which are selectively moved into engagement to effect the desired gear ratio comprising, a source of fluid under pressure, a fluid receiving sump, at least one actuating cylinder having a piston connected to one of said gear-box members to be moved in a gear change, at least one fluid actuated two-position three-way main valve of large capacity connected to each actuating cylinder and also connected to said fluid source and said fluid-receiving sump, said main valve having a large cross-sectional area in each direction of operation, an electromagnetic two-position three-way primary valve actuated by electrical signals controlling the gear change operations, the primary valve having only a small cross-sectional area in each direction of operation and being in fluid communication on the one hand with means to actuate the main valve and on the other hand with the fluid source and the sump, said fluid pressure source, the sump, all of said cylinders and all of said valves being mounted on a single base which is secured as a cover to the gear box.

2. The apparatus of claim 1 wherein the fluid pressure source includes a reservoir and a pump and all connections between the reservoir, pump, actuating cylinders and valves are direct orifice to orifice connections without intermediate pipes.

3. Apparatus for automatically or semi-automatically performing gear changes in gear boxes having multi-ratio gear wheels and axially slidable pinions or toothed dogs which are to be brought into engagement to provide the different ratios, said apparatus comprising a fluid pressure source, a fluid-receiving sump and actuating cylinders, pistons in said cylinders connected to gear box components which are to be moved in performance of a ratio change, said cylinders being connected through at least one hydraulically actuated large capacity main valve to the fluid pressure source and to the sump, said main valve being controlled by an electro-magnetic primary valve of relatively small capacity, a hydraulic actuating cylinder with an electromagnetically actuated valve arrangement for actuating a clutch at the input of the gear box and means for changing the speed of a member of the gear box to synchronize its speed with a member to be engaged thereby, said fluid pressure source, fluid-receiving sump, all actuating cylinders, valves and means for changing speed of a member of the gear box being combined together in a constructional unit adapted to be mounted on the gear box as a cover and comprising a single base on which the said source, sump, cylinders, valves and speed changing means are mounted.

4. The apparatus of claim 3 wherein an actuating cylinder with a control valve arrangement serving to engage and disengage a reverse gear is mounted on the said base.

* * * * *